US005739787A

United States Patent [19]
Burke et al.

[11] Patent Number: 5,739,787
[45] Date of Patent: Apr. 14, 1998

[54] VEHICLE BASED INDEPENDENT TRACKING SYSTEM

[76] Inventors: Edmund D. Burke, P.O. Box 5090; Martin S. Waldman, P.O. Box 5473, both of Vandenberg, Calif. 93437

[21] Appl. No.: 702,061

[22] Filed: Aug. 2, 1996

Related U.S. Application Data

[63] Continuation-in-part of Ser. No. 425,929, Apr. 20, 1995, abandoned.

[51] Int. Cl.$^6$ ..................................................... G01S 5/02
[52] U.S. Cl. .............................. 342/357; 701/220; 244/3.2
[58] Field of Search ........................... 342/357; 364/453, 364/462; 244/3.19, 314, 3.2, 3.11

[56] References Cited

U.S. PATENT DOCUMENTS

| | | | |
|---|---|---|---|
| 5,187,805 | 2/1993 | Bertiger et al. | 455/12.1 |
| 5,228,854 | 7/1993 | Eldridge | 433/11 |
| 5,397,079 | 3/1995 | Strentz et al. | 244/3.2 |
| 5,455,587 | 10/1995 | Schneider | 342/62 |

*Primary Examiner*—Thomas H. Tarcza
*Assistant Examiner*—Dao L. Phan

[57] ABSTRACT

As an improvement to the architecture, utility, efficiency and cost associated with the procurement, setup, and operation of a real-time tracking/autonomous destruct and data recovery system for vehicles capable of exhibiting great velocities, accelerations, and attitude rates during all mission phases. A vehicle based independent tracking system 10 consists of an on-board vehicle data tracking system 12, an on-board vehicle data transmission system 14, an off-board flight data monitoring system 16, and a remote computer setup/test system 18. An interface umbilical-a 82 interconnects on-board vehicle data tracking system 12 with on-board vehicle data transmission system 14 for real-time transmission of dynamic time, space and position information of rockets and like vehicles to off-board flight data monitoring system 16 during all mission phases via an RF communication interface 86. Remote computer setup/test system 18 interfaces with on-board vehicle data tracking system 12 via an interface umbilical-b 84 for complete system checkout prior to launch.

6 Claims, 2 Drawing Sheets

VEHICLE BASED INDEPENDENT TRACKING SYSTEM

BACKGROUND—CROSS REFERENCE TO RELATED APPLICATIONS

This application is a continuation-in-part of Ser. No. 08/425,929 filed Apr. 20, 1995, now abandoned. The contents thereof are incorporated by reference herein. The underlying concepts of this patent were first publicly disclosed 1 Aug. 1994 in a proprietary proposal to the United Space Researcher's Association Student Explorer Demonstration Initiative (STEDI) program.

BACKGROUND—FIELD OF INVENTION

This invention relates to an improvement in the architecture, utility, efficiency and cost associated with the procurement, setup, and operation of a real-time tracking/autonomous destruct and data recovery system for vehicles capable of exhibiting great velocities, accelerations, and attitude rates during all mission phases.

BACKGROUND—DESCRIPTION OF PRIOR ART

Simply stated, the science of object tracking is the process of utilizing sensors in combination with a known reference point to determine the desired fix of an object of interest. The degree of desired fix is specifically determined by comprising and correlating the parameters of time, space and position information. Additionally, by integrating the product of these parameters, one can easily arrive at additional descriptive indicators such as acceleration, jerk, non-nominal twisting motions and twisting trajectories.

The knowledge and uses of manmade tracking systems predate modern times, and most likely exposed its beginnings during the hunting and gathering era of man's evolution many eons ago. The early 1940s World War II era ushered in the foundational modern day concepts of today's radar based architecture for tracking rockets and similar vehicles. The integration and use of these radar assets have synergistically enabled the field of rocketry to evolve into highly sophisticated systems such as the Space Shuttle. Such launch vehicles require the use of precise sophisticated tracking radar's primarily for safety reasons. Specifically, a trajectory/orbit monitoring officer requires accurate real-time position and velocity data to determine if a launch vehicle has strayed off course during the boost phase. The officer then has the option to safely destroy the vehicle before it can become a hazard to life or property.

By shifting the real-time trajectory sensing and tracking function from traditional ground/air based radar systems to a self-contained position, velocity, orientation, sensing, tracking, reporting, and autonomous destruct capable system aboard the vehicle itself; one arrives at this invention consisting of a unique combination of commercial off-the-shelf hardware which is a highly reliable and inexpensive approach to monitoring/reporting the dynamic trajectory parameters of a vehicle from launch to orbit/recovery by integrating and applying Global Positioning System and Inertial Measurement Unit technologies in a stand-alone, user oriented system which transmits the vehicle's real-time position, velocity, and orientation to the user at a pre-determined data reception location. Additionally, the system will have the ability to interpret this information and destroy the vehicle if necessary without input from the user. A hardened-recoverable on-board microprocessor with solid state memory will be capable of recording all events through mission termination for backup data analysis.

This on-board resolution, transmission, analysis and backup capability enables any trajectory/orbit monitoring officer at any pre-determined location to obtain vehicle tracking data which is more accurate than any radar system or multiple combination of radar systems could possibly provide, and at an operational cost which is estimated to be one-tenth of a radar based tracking system, and in most cases is probably much less. To accomplish this efficient operation, the system exhibits the following qualities in combination with the tracking and reporting system aboard the vehicle:

1) Trajectory parameters are available upon first motion of the vehicle. This allows for critical safety assessments to occur immediately.

2) Launches can occur from any suitable location around the world where a user desires to implement a self-contained tracking system.

3) Educational and Commercial utilization of space will now become much more possible and practical due to the minor costs associated with monitoring trajectory and orbital parameters when utilizing this system.

4) By placing multiple tracking systems aboard a vehicle stack, one may determine trajectory/orbital parameters and configuration of separate systems such as the payload and vehicle stages during a nominal or non-nominal mission, and correlate the data for additional redundancy/confidence during boost phase.

5) During a non-nominal twisting trajectory, precise data consisting of position, velocity, roll, pitch and yaw will be available to the trajectory monitoring officer for fully informed decision making.

6) Implementation can occur on any rocket/spacecraft or similar type vehicle with minimal effort.

7) A repetitive user may opt to purchase the entire system and easily amortize the cost over a nominal number of missions.

8) Small businesses may purchase the system and offer the capability as a service to prospective launch customers.

9) An autonomous destruct capability option will be available along with a recoverable data storage device for post-flight analysis.

10) Coverage envelopes a vehicle's first motion through geosyncronous orbit at no additional cost.

To the best of our knowledge, there is no existing prior art regarding a Vehicle Based Independent Tracking System as described by this invention. There is however an invention by Eldridge, U.S. Pat. No. 5,228,854 which discusses a non-real-time system which mounts aboard a launch vehicle platform to obtain ordnance trajectory data for combat system training. Due to the nature of Eldridge's invention, it could not be adapted to the intent and demands as required by our invention for the following major reasons:

1) GROUND STATION: Col 2 Lines 58–62: Addresses a post flight ground infrastructure, not real-time as addressed in our invention./Col 3 Lines 52–54 & Col 6 Lines 27–28: Further demonstrates the non-real-time limitations of this system.

2) SPECIFICS REGARDING POST-FLIGHT ONLY CAPABILITY: Col 3 Lines 25–34/Col 5 Lines 55–62/Col 7 Lines 35–36/Col 7 Lines 40–44/Col 9 Lines 32–45: Further specifies a post flight only type system which can only determine missile flight trajectories from models/simulation stored in memory, therefore, cannot determine actual real-time missile trajectory information for an errant or nominal vehicle flight. In other words, once the missile is launched, there is no way to monitor its actual flight path or to provide an autonomous vehicle destruct capability, as this system utilizes simulation-only missile software models stored in memory. This is in direct contrast to our system whose sole purpose is to remotely monitor flight profile parameters of a vehicle during all mission phases.

3) SPECIFICS REGARDING PHYSICAL APPLICATION: Col 3 Lines 40–44/Col 4 Lines 62–68/Col 5 Lines 1–11/FIGS. 1,2,3,10.: The scope and purpose of Eldridge's invention is specific to assembly upon a launch vehicle platform, and not the launch vehicle itself. This application thereby precludes remote monitoring of the launched vehicle once it is released from the launch vehicle platform. Additionally, it is important to note that Eldridge's pod receives its power/data interface solely from the aircraft/launch vehicle platform (Col 6 Lines 52–53, FIG. 4 items 504 and 506). This is in direct contrast to our invention which is specific to the application upon the launch vehicle itself, which in turn makes it possible to remotely monitor flight vehicle parameters of a launched vehicle during all mission phases.

4) SPECIFICS REGARDING AUTONOMOUS CAPABILITIES: Nowhere in Eldridge's patent does he discuss his instrumented vehicle having an autonomous self-destruct capability, or a recoverable data storage device being available to provide backup data in the event of a non-nominal flight condition, including a high G impact.

In addition to the previously described disadvantages inherent with radar dependent tracking systems, the lack of a simple approach to this science also results in the following disadvantages:

(a) The relatively fixed location of radar systems preclude their repositioning along the vehicle's trajectory at each instant of time, thus limiting their solution accuracy.

(b) The inherent complexities of radar systems and communication/computer system networks interconnecting them leaves a user vulnerable to down time whereby a scheduled mission could be jeopardized.

(c) Existing tracking ranges are typically large government owned institutions requiring a user to satisfy a myriad of bureaucratic requirements at great expense.

(d) Users are forced to launch from pre-existing sites where tracking ranges are located, thereby compromising payload throw-weight.

(e) Radar systems are not capable of providing accurate time, space and position information as related to attitude, on an errant vehicle which is tumbling out of control.

(f) A user is charged significant range use fees even if the mission is scrubbed due to the masses of personnel and systems required to support the intended launch opportunity.

(g) Radar systems and networks are cumbersome, costly, and difficult to maintain.

(h) The off-board nature of radar systems preclude an autonomous destruct capability aboard a vehicle which is inherently related to the radar system.

(i) Radar costs to track a vehicle increase as distance increases between the vehicle and radar, as well as degradation of accuracy.

The existence of all these complexities and shortcomings possibly explain and justify why the science, application and benefits of a simple vehicle based independent tracking systems are unheard of within the vehicle launch community. It is clearly evident that the small users in education and commercial space endeavours have never had the opportunity to reap the benefits of a practical, simple to use vehicle tracking system. Additionally with this approach, large well-capitalized institutions can also realize the cost savings and simplicity associated with this system.

OBJECTS AND ADVANTAGES

Accordingly, the main objects and advantages of this invention are that it be smartly designed to safely, efficiently, and inexpensively perform the function of a vehicle tracking system for any user to employ at any suitable location.

In addition to these clear advantages of our interpretation of the most practical form a vehicle based independent tracking system should take the form of, this invention also benefits from the following important advantages:

(a) Since the vehicle is continually updating its own fix during movement, it is essentially emulating the accuracy's which could be theoretically obtained if the radar systems were physically traveling along with the vehicle.

(b) The vehicle based independent tracking system's simplistic nature guarantees its availability at virtually any time with very little preparation.

(c) To the user, the vehicle based independent tracking system simply becomes a single system to prepare for a scheduled launch with no complex interfaces required.

(d) A vehicle based independent tracking system can be established at any location which is suitably located for a launch environment.

(e) The vehicle based independent tracking system is a high dynamic acceleration and jerk system which can update position, velocity, roll/pitch/yaw at a rapid and highly useful rate.

(f) Since a vehicle based independent tracking system is a small self-contained system, it does not require the excessive equipment or personnel inherently necessary to bring up a network of radar's and data systems.

(g) A vehicle based independent tracking system is compact, inexpensive, and simple to maintain.

(h) A vehicle based independent tracking system enables a vehicle to have an autonomous destruct and crash survivable backup data capability.

(i) A vehicle based independent tracking system will function independent of orbit and altitude of the vehicle under consideration.

Further objects and advantages of this invention are to provide a budgeted or fully capitalized user with a simplified tool for directly ascertaining the required time-space-position information of their vehicle during powered flight and the subsequent mission. Application of this information will fully satisfy safety and mission requirements.

These, and all of the above positive factors clearly define an invention which brings about the concept of user control and responsibility for a vehicle and mission in a direct and simple participatory manner. The lightweight and portable nature of this invention further enhances the options of use at any suitable location on any vehicle without the need for supplementary cumbersome systems and large tracts of real estate. Still further objects and advantages will become apparent from a consideration of the ensuing description and drawings.

DRAWING FIGURES

Figure 1:
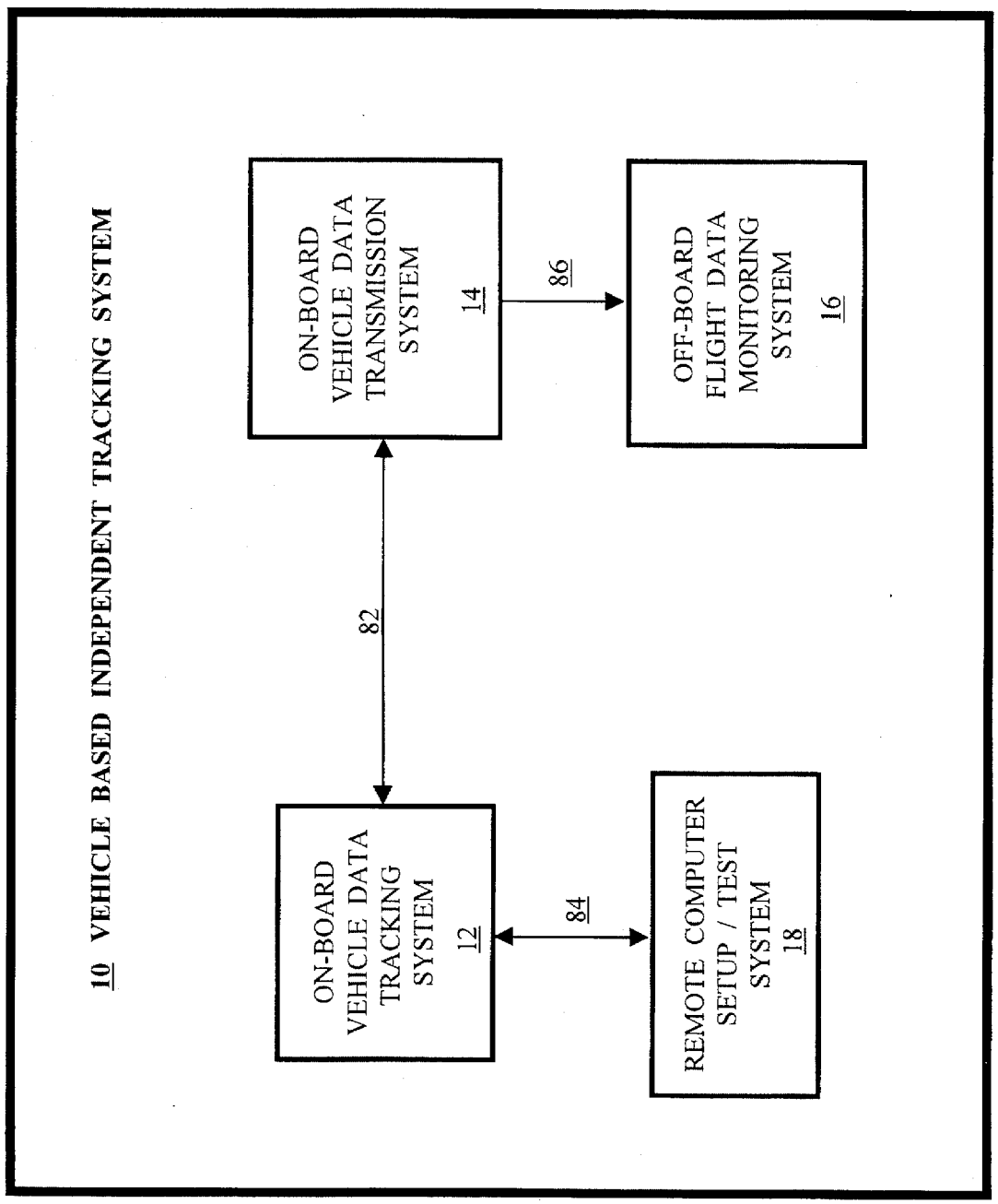
FIG. 1 is a functional external block diagram depicting the delineation of major system responsibilities within the vehicle based independent tracking system.

REFERENCE NUMERALS IN DRAWINGS 10 vehicle based independent tracking system
12 on-board vehicle data tracking system
14 on-board vehicle data transmission system
16 off-board flight data monitoring system
18 remote computer setup/test system
20 patch antenna receiving system
22 RF/power umbilical line-a
24 antenna switching unit and phase compensator
25 data/power umbilical line
26 RF/power umbilical line-b
28 global positioning system receiver
30 data/power umbilical line-a
32 inertial measurement unit
34 data/power umbilical line-b
36 array of mission specific environmental monitoring sensors
38 data/power umbilical line-c
40 power source
42 power umbilical line
44 microcontroller/power switching system
46 data/power umbilical line-d
48 telemetry transmitter-a
50 RF cable line-a
52 diplexor
54 data/power umbilical line-e
56 delay buffer
58 data/power umbilical line-f
60 telemetry transmitter-b
62 RF cable line-b
64 radio frequency test interface
66 RF cable line-c
68 RF cable line-d
70 radiating antenna system
72 RF communication path
74 telemetry receiving/processing station
76 data umbilical line-a
78 user data terminal
80 data umbilical line-b
82 interface umbilical-a
84 interface umbilical-b
86 RF communication interface

DESCRIPTION—FIGS. 1 TO 2

A vehicle based independent tracking system 10 as illustrated in FIG. 1 consists of an on-board vehicle data tracking system 12, an on-board vehicle data transmission system 14, an off-board flight data monitoring system 16, and a remote computer setup/test system 18. An interface umbilical-a 82 interconnects on-board vehicle data tracking system 12 with on-board vehicle data transmission system 14 for data transmission to off-board flight data monitoring system 16 via an RF communication interface 86. Remote computer setup/test system 18 interfaces with on-board vehicle data tracking system 12 via an interface umbilical-c 84 for system checkout prior to launch.

Figure 2:
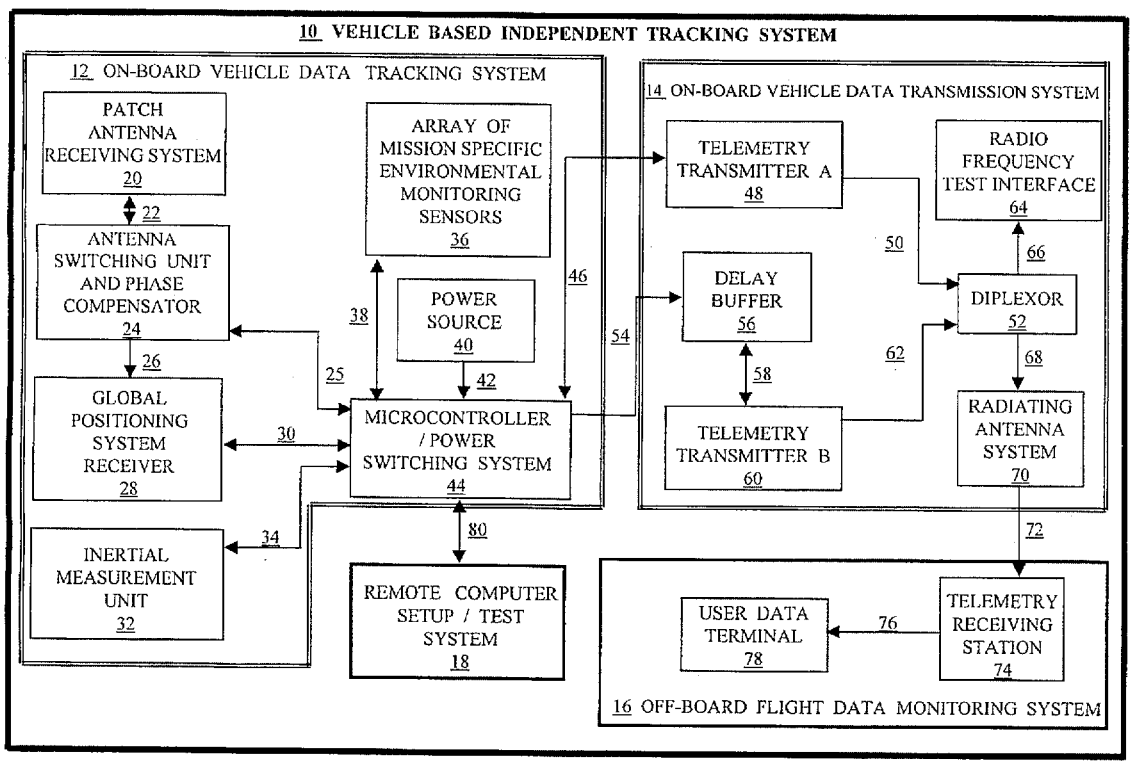
FIG. 2 is a block diagram of the entire interactive architecture of the vehicle based independent tracking system's major components.

Vehicle based independent tracking system 10 as illustrated in FIG. 2 consists of on-board vehicle data tracking system 12, on-board vehicle data transmission system 14, off-board flight data monitoring system 16, and remote computer setup/test system 18.

Internal to on-board vehicle data tracking system 12 as illustrated in FIG. 2 is a patch antenna receiving system 20 interfacing with an antenna switching unit and phase compensator 24 via an RF/power umbilical line-a 22. A global positioning system receiver 28 interfaces with antenna switching unit and phase compensator 24 output via an RF/power umbilical line-b 26 and a microcontroller/power switching system 44 via a data/power umbilical line-a 30. Microcontroller/power switching system 44 additionally contains mission profile range safety boundary algorithms, solid state memory devices, and also interfaces with antenna switching unit and phase compensator 24 via a data/power umbilical line 25, an inertial measurement unit 32 output via a data/power umbilical line-b 34, a power source 40 output via a power umbilical line 42, and an array of mission specific environmental monitoring sensors 36 outputs via a data/power umbilical line-c 38.

Internal to on-board vehicle data transmission system 14 as illustrated in FIG. 2 is a telemetry transmitter-a 48 that interfaces with microcontroller/power switching system 44 output via a data/power umbilical line-d 46. A delay buffer 56 interfaces with microcontroller/power switching system 44 output via a data/power umbilical line-e 54, and a telemetry transmitter-b 60 interfaces with delay buffer 56 output via a data/power umbilical line-f 58. A diplexor 52 combines outputs of telemetry transmitter-a 48, and telemetry transmitter-b 60 via an RF cable line-a 50 from telemetry transmitter-a 48, and an RF cable line-b 62 from telemetry transmitter-b 60. Output of diplexor 52 physically terminates at a radio frequency test interface 64 via an RF cable line-c 66, and a radiating antenna system 70 via an RF cable line-d 68.

Internal to off-board flight data monitoring system 16 as illustrated in FIG. 2 is a telemetry receiving/processing station 74 which is linked to a user data terminal 78 via a data umbilical line-a 76. Telemetry receiving/processing station 74 acquires data transmissions from radiating antenna system 70 via an RF communication path 72. Additionally, remote computer setup/test system 18 as illustrated in FIG. 2 interfaces with microcontroller/power switching system 44 via a data umbilical line-b 80.

From the description above, a number of advantages of this vehicle based independent tracking system become evident:

(a) The vehicle is its own tracking authority whose performance cannot be equaled by any other tracking system, radar or otherwise.

(b) A user is autonomous and can directly monitor the health of their vehicle based independent tracking system during all time frames.

(c) Users can shift resources more towards the science and purpose of the mission itself, instead of being consumed by the complexities and requirements inherent in the present types of tracking systems which have nothing to do with the true mission objectives.

(d) Launches can be performed from any suitable platform in any suitable location, be it land-based, water-based or air-based.

(e) Tracking officers can maintain complete knowledge of a vehicle's status even under the severest of break-up conditions.

(f) If a launch is scrubbed, the costs incurred for the day(s) of attempted tracking effort is extremely minimal.

(g) Vehicle based independent tracking system management during all aspects of use requires minimal attention.

(h) A user can choose the degree and types of autonomous monitoring/destruct capabilities which are desirable for the applicable mission profile.

(i) A vehicle based independent tracking system is applicable in all mission environments and phases independent of altitude and orbit.

OPERATION—FIGS. 1–2

Vehicle based independent tracking system 10 as illustrated in FIG. 1 and FIG. 2 is an integrated consortium of functional hardware, firmware and software responsibilities interacting to form a single whole system. Onboard the vehicle are the two distinct functions of vehicle tracking via on-board vehicle data tracking system 12, and transmission of that resolved tracking data via on-board vehicle data transmission system 14. Off-board the vehicle are two distinct functions. Function one being setup and checkout of on-board vehicle data tracking system 12 and on-board vehicle data transmission system 14 via remote computer setup/test system 18. Function two being monitoring of flight by responsible tracking officers utilizing off-board flight data monitoring system 16.

As illustrated in FIG. 1, interface umbilical-a 82 interconnects on-board vehicle data tracking system 12 with on-board vehicle data transmission system 14 for dynamic transmission of time, space and position information of rockets and like vehicles to off-board flight data monitoring system 16 during all mission phases via RF communication interface 86. Remote computer setup/test system 18 interfaces with on-board vehicle data tracking system 12 via interface umbilical-b 84 for complete system checkout prior to launch.

As depicted in FIG. 2, internal to vehicle based independent tracking system 10 is on-board vehicle data tracking system 12 designed to selectively capture and utilize standard global positioning system satellite data via patch antenna receiving system 20 while simultaneously processing and integrating products of inertial measurement unit 32 with global positioning system 28 data. Patch antenna receiving system 20 is in constant view of existing satellites comprising the existing Global Positioning System satellite network, and continually gathers and passes raw positioning and velocity data in the form of RF communication signals into antenna switching unit and phase compensator 24 via RF/power umbilical line-a 22. Antenna switching unit and phase compensator 24 interfaces with RF communication signals of patch antenna receiving system 20 via RF/power umbilical line-a 22, and passes raw positioning and velocity data in the form of RF communication signals to global positioning system receiver 28 via RF/power umbilical line-b 26 for conversion of raw positioning and velocity data into a usable velocity and position data product. Microcontroller/power switching system 44 selectively switches patch antennas within patch antenna receiving system 20 during flight via antenna switching unit and phase compensator 24 through data/power umbilical 25. Inertial measurement unit 32 is self-contained, and determines acceleration and orientation data for direct utilization within on-board vehicle data tracking system 12. Array of mission specific environmental monitoring sensors 36 can include vibration, shock, temperature and pressure among others. Determination of these individual requirements for environmental sensing in the launch environment is normally up to the individual user, and is mission specific. Power source 40 can originate from batteries aboard the vehicle itself, an external source, or a combination of both. Microcontroller/power switching system 44 receives power for itself and for distribution via power umbilical line 42. Distribution of power from microcontroller/power switching system 44 to global positioning system receiver 28 is via data/power umbilical line-a 30, and to inertial measurement unit 32 via data/power umbilical line-b 34. Additionally, if array of mission specific environmental monitoring sensors 36 have any specific power requirements, power would be available via data/power umbilical line-c 38. Microcontroller/power switching system 44 also performs a primary function of data control and management amongst all interacting elements of on-board vehicle data tracking system 12 and on-board vehicle data transmission system 14. Essentially, microcontroller/power switching system 44 serves as the on-board brain of vehicle based independent tracking system 10. Microcontroller/power switching system 44 performs data control and management functions with global positioning system receiver 28 via data/power umbilical line-a 30, inertial measurement unit 32 via data/power umbilical line-b 34, and array of mission specific environmental monitoring sensors 36 via data/power umbilical line-c 38. Additionally, microcontroller/power switching system 44 contains predetermined three dimensional time, space and position information range safety limit line algorithms in software for defining the parameters for initiation of an autonomous self-destruct event.

Also internal to vehicle based independent tracking system 10 as illustrated in FIG. 2 is on board vehicle data transmission system 14 designed to receive and subsequently transmit on-board vehicle data tracking system 12 output to off-board flight data monitoring system 16 where a designated tracking officer is located. On-board vehicle data transmission system 14 interfaces with on-board vehicle data tracking system 12 via microcontroller/power switching system 44 through data/power umbilical line-d 46. Delay buffer 56 within on-board vehicle data transmission system 14 also interfaces with on-board vehicle data tracking system 12 via microcontroller/power switching system 44 through separate data/power umbilical line-e 54. Telemetry transmitter-b 60 receives delayed data from delay buffer 56 via data/power umbilical line-f 58 to provide backup coverage in the event of data loss from telemetry transmitter-a 48. Diplexor 52 integrates data output from telemetry transmitter-a 48 via RF cable line-a 50, and telemetry transmitter-b 60 via RF cable line-b 62 for transmission through radiating antenna system 70 via RF cable line-d 68. Radio frequency modulated data is also available from diplexor 52 at radio frequency test interface 64 via an RF cable line-c 66 for system level checks prior to flight without radiating through radiating antenna system 70.

Internal to off-board flight data monitoring system 16 as illustrated in FIG. 2 is telemetry receiving station 74 and user data terminal 78. Telemetry receiving/processing station 74 receives the total data product of on-board vehicle data tracking system 12 and on-board vehicle data transmission system 14 via RF communication path 72. Telemetry receiving/processing station 72 subsequently passes the complete data solution to user data terminal 78 via data umbilical line-a 76 for application by a designated tracking officer.

Remote computer setup/test system 18 comprises the final off-board system as depicted in FIGS. 1 and 2. In FIG. 2, remote computer setup/test system 18 interfaces with microcontroller/power switching system 44 via data umbilical line-b 80 to provide command and monitoring access to on-board vehicle data tracking system 12 and on-board vehicle data transmission system 14 during all pre-launch operations.

SUMMARY, RAMIFICATIONS, AND SCOPE

Accordingly, the reader will see that the type of tracking system defined by this invention is the embodiment of virtues that serve to make the vehicle based independent tracking system a worthwhile and inexpensive proposition for all users small and large. With the advent of the vehicle based independent tracking system into the marketplace, educational, commercial and other users will no longer be consumed as well as discouraged by the complexities which accompany the highly intensive requirements and costs associated with the utilization of a radar dependent tracking range. Additionally, the fixed locations of most tracking ranges are not usually optimal for mission requirements. Furthermore, the financial and reliability guesswork involved with utilizing such tracking ranges will become a thing of the past. With this invention, any user will have a simple, coherent, instant, and extremely usable system for integrating the substantial benefits of a vehicle based tracking system into their mission requirements and profile. Furthermore, the vehicle based independent tracking system has the additional advantages in that:

- it permits a user to quickly understand and utilize the unequaled benefits of the vehicle based independent tracking system's performance characteristics.
- it enables the user to schedule the vehicle based independent tracking system test and checkout sequences to suit the primary mission timelines, and not vice versa.
- it allows a user to structure their work force and resources in the most efficient manner possible by freeing up personnel that would ordinarily be dedicated full time to ensuring all tracking range interfaces and requirements were met.
- it permits the flexibility necessary to best match a launch site to the payload's on-orbit requirements.
- it allows a user to fully reconstruct a mishap for later study, assessment and corrective actions.
- it enables many launch attempts without significantly impacting the user's budget.
- it offers the greatest operational capability with the smallest possible impacts to use, cost, and maintainability.
- it allows for fulfillment of critical mission parameters related to the mission environment via an array of tracking and destruct options.
- it is instantly available for use on all vehicles regardless of mission.

Although the description above contains many specifications, these should not be construed as limiting the scope of the invention, but as merely providing illustrations of the presently preferred embodiment of this invention. For example, multiple transmitters could be interconnected with a specific time delay assigned to each, which would ensure that data is received throughout all situations when signal shielding could occur such as booster plume effect. Additionally, the true portability of this system could be demonstrated in a scenario whereby the control and monitoring centers are located aboard an aircraft which is functioning in flight at any suitable remote location, and even perhaps as the vehicle's launch platform. Additionally, this system need not only be intended for use aboard rockets and like flying vehicles. It may also be built from lower cost hardware for use on any object where tracking/manipulation of the object is desired in the air, or on the ground. Thus, the scope of the invention should be determined by the appended claims and their legal equivalents.

We claim:

1. A vehicle based independent tracking system comprised of:

An object orientation and positioning system comprising an inertial measurement means and a global positioning system means capable of determining real-time dynamic space, position and time information solutions of a vehicle from ground operation through geosynchronous orbit mission phases, including high dynamic environments in the vicinity of five thousand meters per second in velocity, 10 g in acceleration, and 10 g per second in differential acceleration during all mission phases nominal or not, said inertial measurement means and global positioning system means being located aboard said vehicle;

said global positioning system means and inertial measurement means connected with a microcontroller system means providing power and data flow orchestration within said vehicle based independent tracking system, said microcontroller system means containing gravity software algorithms and switches to autonomously detect life and property threatening non-nominal vehicle performance, and send appropriately responsive destruct commands to said vehicle upon said vehicle's crossing of pre-determined three dimensional time, space and position information range safety limit lines residing in software, said microcontroller system means containing memory survivable in high dynamic impact scenarios in the vicinity of 100 g, said microcontroller system means also connected with a power means, a mission specific array of application sensor means, a checkout and monitoring system means, a telemetry transmission means, and a radiating antenna system means, said radiating telemetry transmission means communicating with a telemetry receiver means off-board said vehicle, said telemetry receiver means connected with a user data terminal means, whereby a user can remotely monitor and respond to real-time flight profile parameters of said vehicle during all mission phases.

2. A tracking system as claimed in claim 1 wherein said system will provide nominally accurate time, space and position information under errant flight conditions with extremely high roll, pitch and yaw rates in the vicinity of three hundred sixty degrees per second.

3. A tracking system as claimed in claim 2 wherein an additional complement of telemetry transmission means connected with said microcontroller system means via a delay buffer means for providing backup data to said user in the event of real time data flow impairment.

4. A tracking system as claimed in claim 3 wherein said system functions independently of said user at said user data terminal means, allowing said microprocessor to maintain full control of said vehicle's destruct decisions and implementation, and post impact backup data availability.

5. A tracking system as claimed in claim 4 wherein said system is additionally a stand-alone or redundant navigation system on-board said vehicle.

6. A tracking system as claimed in claim 5 wherein said system is functionally adaptable to any said vehicle regardless of said vehicle's dimensions, weight, electrical and environmental characteristics.

* * * * *